US008473298B2

(12) United States Patent
Rogers

(10) Patent No.: US 8,473,298 B2
(45) Date of Patent: Jun. 25, 2013

(54) PRE-RESAMPLING TO ACHIEVE CONTINUOUSLY VARIABLE ANALYSIS TIME/FREQUENCY RESOLUTION

(75) Inventor: Kevin Christopher Rogers, Albany, CA (US)

(73) Assignee: Apple Inc., Cupertino, CA (US)

( * ) Notice: Subject to any disclaimer, the term of this patent is extended or adjusted under 35 U.S.C. 154(b) by 2195 days.

(21) Appl. No.: 11/265,437

(22) Filed: Nov. 1, 2005

(65) Prior Publication Data

US 2007/0100606 A1 May 3, 2007

(51) Int. Cl.
*G10L 13/00* (2006.01)
*G10L 19/14* (2006.01)
*G06F 17/00* (2006.01)

(52) U.S. Cl.
USPC .... 704/265; 704/205; 704/211; 704/E19.001; 704/E19.011; 704/E19.012; 700/94

(58) Field of Classification Search
USPC ........... 704/205, E19.001, E19.011, E19.012, 704/211, 265; 341/61; 711/110
See application file for complete search history.

(56) References Cited

U.S. PATENT DOCUMENTS 5,111,505 A * 5/1992 Kitoh et al. ................... 704/265
6,384,759 B2 * 5/2002 Snyder .......................... 341/123
6,519,558 B1 * 2/2003 Tsutsui ......................... 704/207
6,978,236 B1 * 12/2005 Liljeryd et al. ............... 704/219
7,181,389 B2 * 2/2007 Liljeryd et al. ............... 704/219
7,191,121 B2 * 3/2007 Liljeryd et al. ............... 704/219
7,565,289 B2 * 7/2009 Rogers .......................... 704/229
7,917,358 B2 * 3/2011 Rogers .......................... 704/226
7,917,360 B2 * 3/2011 Rogers .......................... 704/229
8,311,657 B2 * 11/2012 Cannistraro et al. ............ 700/94
2005/0219081 A1 * 10/2005 Lee et al. ........................ 341/61
2006/0273938 A1 * 12/2006 Van Den Enden et al. ...... 341/61
2007/0016407 A1 * 1/2007 Sato .............................. 704/205
2007/0046536 A1 * 3/2007 Jia et al. ................... 342/357.12
2007/0078541 A1 * 4/2007 Rogers ............................ 700/94
2007/0078650 A1 * 4/2007 Rogers .......................... 704/229
2008/0222525 A1 * 9/2008 Cannistraro et al. .......... 715/716
2009/0276069 A1 * 11/2009 Rogers ............................ 700/94

OTHER PUBLICATIONS

Mitra, "Digital Signal Processing a Computer-Based Approach," Second Edition, 2001, pp. 155-176.*
Rabiner and Schafer "Digital Processing of Speech Signals," 1st edition, 1978, pp. 24-31,.*
Puckette, Miller, "Phase-locked Vocoder," IEEE , Reprinted from Proceedings, IEEE ASSP Conference on Applications of Signal Processing to Audio and Acoustics (Mohonk, N. Y.) 1995.

* cited by examiner

*Primary Examiner* — Edgar Guerra-Erazo
(74) *Attorney, Agent, or Firm* — Blakely, Sokoloff, Taylor & Zafman LLP

(57) ABSTRACT

A digital audio signal can be processed using continuously variable time-frequency resolution by selecting a portion of an input digital audio signal, resampling the selected portion of the input digital audio signal, generating a plurality of spectral characteristics associated with the resampled portion of the input digital audio signal, generating a portion of an output digital audio signal from the plurality of spectral characteristics, and resampling the portion of the output digital audio signal. Further, resampling the selected portion of the input digital audio signal can comprise determining a sampling ratio and resampling the selected portion of the input digital audio signal in accordance with the determined sampling ratio. Additionally, the portion of the output digital audio signal can be resampled in accordance with the inverse of the determined sampling ratio. The sampling ratio can be determined based on a time-frequency resolution requirement associated with an audio processing algorithm.

25 Claims, 8 Drawing Sheets

PRE-RESAMPLING TO ACHIEVE CONTINUOUSLY VARIABLE ANALYSIS TIME/FREQUENCY RESOLUTION

BACKGROUND

The present disclosure relates to digital audio signals, and to systems and methods for providing continuously variable time-frequency resolution in digital audio signal processing.

Digital-based electronic media formats have become widely accepted. The development of faster computer processors, high-density storage media, and efficient compression and encoding algorithms have led to an even more widespread implementation of digital audio media formats in recent years. Digital compact discs (CDs) and digital audio file formats, such as MP3 (MPEG Audio—layer 3) and WAV, are now commonplace. Some of these formats are configured to store digitized audio information in an uncompressed fashion while others store compressed digitized audio information. The ease with which digital audio files can be generated, duplicated, and disseminated also has helped to increase their popularity.

Audio information can be detected as an analog signal and represented using an almost infinite number of electrical signal values. An analog audio signal is subject to electrical signal impairments, however, that can negatively affect the quality of the recorded information. Any change to an analog audio signal value can result in a noticeable defect, such as distortion or noise. Because an analog audio signal can be represented using an almost infinite number of electrical signal values, it is difficult to detect and correct such defects. Moreover, the methods of duplicating analog audio signals cannot approach the speed with which digital audio files can be reproduced. In some instances, the problems associated with analog audio signal processing can be overcome, without a significant loss of information, simply by digitizing the audio signal.

FIG. 1 presents a portion of an analog audio signal 100. The amplitude of the analog audio signal 100 is shown with respect to the vertical axis 105 and the horizontal axis 110 indicates time. In order to digitize the analog audio signal 100, the waveform 115 is sampled at periodic intervals, such as at a first sample point 120 and a second sample point 125. A sample value representing the amplitude of the waveform 115 is recorded for each sample point. The highest frequency present in the waveform being sampled indicates the bandwidth of the signal. If the sampling rate is less than twice the bandwidth of the signal being sampled, the resulting digital signal will be substantially identical to the result obtained by sampling a waveform of a lower frequency. As such, in order to be adequately represented, the waveform 115 must be sampled at a rate greater than twice the bandwidth that is to be included in the reconstructed signal. To ensure that the waveform is free of frequencies higher than one-half of the sampling rate, which is also known as the Nyquist frequency, the audio signal 100 can be filtered prior to sampling. Therefore, in order to preserve as much audible information as possible, the sampling rate should be sufficient to produce a reconstructed waveform that cannot be differentiated by a human listener from the waveform 115.

The human ear generally cannot detect frequencies greater than 16-20 kHz, so the sampling rate used to create an accurate representation of an acoustic signal should be at least 32 kHz. For example, compact disc quality audio signals are generated using a sampling rate of 44.1 kHz. Once the sample value associated with a sample point has been determined, it can be represented using a fixed number of binary digits, or bits. Encoding the almost infinite possible values of an analog audio signal using a finite number of binary digits will almost necessarily result in the loss of some information. Because high-quality audio is encoded using up to 24-bits per sample, however, the digitized sample values closely approximate the corresponding original analog values. The digitized values of the samples comprising the audio signal can then be stored using a digital-audio file format.

The acceptance of digital-audio has increased dramatically as the amount of information that is shared electronically has grown. Digital-audio file formats that can be transferred between a wide variety of hardware devices are now widely used. In addition to music and soundtracks associated with video information, digital-audio is also being used to store information such as voice-mail messages, audio books, speeches, lectures, and instructions.

The characteristics of digital-audio and the associated file formats also can be used to provide greater functionality in manipulating audio signals than was previously available with analog formats. One such type of manipulation is filtering, which can be used for signal processing operations including removing various types of noise, enhancing certain frequencies, or equalizing a digital audio signal. Another type of manipulation is time stretching, in which the playback duration of a digital audio signal is increased or decreased, either with or without altering the pitch. Compression is yet another type of manipulation, by which the amount of data used to represent a digital audio signal is reduced. Through compression, a digital audio signal can be stored using less memory and transmitted using less bandwidth. Digital audio processing strategies include MP3, AAC (MPEG-2 Advanced Audio Codec), and Dolby Digital AC-3.

Some digital audio processing strategies employ techniques for analyzing and manipulating the digital audio data in the frequency domain. In performing such processing, the digital audio data can be transformed from the time domain into the frequency domain block by block, each block being comprised of multiple discrete audio samples. In order to transform a digital audio signal from the time domain, a processing algorithm can convert the blocks of samples into the frequency domain using a Discrete Fourier Transform (DFT), such as the Fast Fourier Transform (FFT). The number of individual samples included in a block of audio data defines the time resolution and the frequency resolution of the transform. Once transformed into the frequency domain, the digital audio signal can be represented using magnitude and phase information, which describe the spectral characteristics of the block.

The FFT is frequently used by digital audio processing strategies because it is computationally more efficient than other transforms. For example, the FFT exploits mathematical redundancies in the DFT algorithm to increase its computational efficiency. In order to achieve this efficiency, however, the FFT algorithm also is constrained by limitations. One such limitation is the window size, or number of samples, the FFT can be configured to process. The FFT algorithm can accept only window sizes defined by the equation window_size=x^y, where x and y are integers. Because computers are binary machines, the window sizes that can be processed by an FFT are given by the equation window_size=2^y, where y is any integer.

As discussed above, the window size determines the time resolution and frequency resolution of the processing algorithm. As the window size becomes larger, the time resolution decreases and the frequency resolution increases. At larger window sizes, the choice between FFT sizes can become difficult. For example, if an audio processing algorithm requires a frequency resolution of 5,000 samples, the FFT algorithm will be required to use a window size of 8,192 samples. Consequently, the algorithm will sacrifice some time resolution because the window size required to take advantage of the FFT is larger than needed. Further, use of the larger window size will not offset the loss in time resolution with improved frequency resolution because the algorithm only requires a frequency resolution of 5,000 samples.

After the window of digital audio data has been processed and the spectral characteristics associated with the window have been determined, the digital audio data can be converted back into the time domain using an Inverse Discrete Fourier Transform (IDFT), such as the Inverse Fast Fourier Transform (IFFT).

As discussed above, digital audio signals can be manipulated using a variety of techniques and methods. Many of these techniques and methods rely on transforming digital audio signals into the frequency domain and consequently require selecting an FFT size that satisfies specific time and frequency resolution values. Because the window size associated with the FFT is constrained, an alternative means that provides continuously variable time-frequency resolution in digital audio signal processing is required.

SUMMARY

The present inventor recognized the need to provide a means for continuously variable time-frequency resolution when processing a digital audio signal. Accordingly, the techniques and apparatus described here implement algorithms for accurate and reliable means of providing continuously variable time-frequency resolution in digital audio signal processing.

In general, in one aspect, the techniques can be implemented to include selecting a portion of an input digital audio signal; resampling the selected portion of the input digital audio signal; generating a plurality of spectral characteristics associated with the resampled portion of the input digital audio signal; generating a portion of an output digital audio signal from the plurality of spectral characteristics; and resampling the portion of the output digital audio signal.

The techniques also can be implemented to include processing the plurality of spectral characteristics associated with the resampled portion of the input digital audio signal. Further, the techniques can be implemented such that processing includes modifying either or both of a magnitude and a phase associated with one or more of the plurality of spectral characteristics. Additionally, the techniques can be further implemented to include resampling the selected portion of the input digital audio signal by upsampling and resampling the portion of the output digital audio signal by downsampling. Additionally, the techniques can be further implemented to include resampling the selected portion of the input digital audio signal by downsampling and resampling the portion of the output digital audio signal by upsampling.

The techniques also can be implemented such that resampling the selected portion of the input digital audio signal further comprises determining a sampling ratio, and resampling the selected portion of the input digital audio signal in accordance with the determined sampling ratio. Further, the techniques can be implemented to include resampling the portion of the output digital audio signal in accordance with the inverse of the determined sampling ratio. Further, the techniques can be implemented to include determining the sampling ratio based on the size of an FFT. Further, the techniques can be implemented to include determining the sampling ratio based on a time-frequency resolution requirement associated with an audio processing algorithm.

In general, in another aspect, the techniques can be implemented to include machine-readable instructions for processing a digital audio signal using continuously variable time-frequency resolution, the machine-readable instructions being operable to perform operations comprising selecting a portion of an input digital audio signal; resampling the selected portion of the input digital audio signal; generating a plurality of spectral characteristics associated with the resampled portion of the input digital audio signal; generating a portion of an output digital audio signal from the plurality of spectral characteristics; and resampling the portion of the output digital audio signal.

The techniques can also be implemented to include machine-readable instructions further operable to perform operations comprising processing the plurality of spectral characteristics associated with the resampled portion of the input digital audio signal. Further, the techniques can be implemented such that the machine-readable instruction for processing the spectral characteristics are further operable to perform operations comprising modifying either or both of a magnitude and a phase associated with one or more of the plurality of spectral characteristics. Additionally, the techniques can be implemented such that the machine-readable instructions are further operable to resample the selected portion of the input digital audio signal by upsampling and resample the portion of the output digital audio signal by downsampling. Additionally, the techniques can be implemented such that the machine-readable instructions are further operable to resample the selected portion of the input digital audio signal by downsampling and resample the portion of the output digital audio signal by upsampling.

The techniques can also be implemented to include machine-readable instructions further operable to perform operations comprising determining a sampling ratio; and resampling the selected portion of the input digital audio signal in accordance with the determined sampling ratio. Further, the techniques can be implemented such that the machine-readable instructions are further operable to perform operations comprising resampling the portion of the output digital audio signal in accordance with the inverse of the determined sampling ratio. Further, the techniques also can be implemented such that the machine-readable instructions are further operable to perform operations comprising determining the sampling ratio based on the size of an FFT. Further, the techniques also can be implemented such that the machine-readable instructions are further operable to perform operations comprising determining the sampling ratio based on a time-frequency resolution requirement associated with an audio processing algorithm.

In general, in another aspect, the techniques can be implemented to include processor electronics configured to perform operations comprising: selecting a portion of an input digital audio signal; resampling the selected portion of the input digital audio signal; generating a plurality of spectral characteristics associated with the resampled portion of the input digital audio signal; generating a portion of an output digital audio signal from the plurality of spectral characteristics; and resampling the portion of the output digital audio signal.

The techniques can also be implemented to include processor electronics further configured to perform operations comprising processing the plurality of spectral characteristics associated with the resampled portion of the input digital audio signal. Additionally, the techniques can also be implemented to include processor electronics further configured to perform operations comprising resampling the selected portion of the input digital audio signal by upsampling and resampling the portion of the output digital audio signal by downsampling. Additionally, the techniques can also be implemented to include processor electronics further configured to perform operations comprising resampling the selected portion of the input digital audio signal by downsampling; and resampling the portion of the output digital audio signal by upsampling.

The techniques can also be implemented to include processor electronics further configured to perform operations comprising determining a sampling ratio and resampling the selected portion of the input digital audio signal in accordance with the determined sampling ratio. Further, the processor electronics can be further configured to resample the portion of the output digital audio signal in accordance with the inverse of the determined sampling ratio. Further, the processor electronics can be further configured to determine the sampling ratio based on a time-frequency resolution requirement associated with an audio processing algorithm.

The techniques described in this specification can be implemented to realize one or more of the following advantages. For example, the techniques can be implemented to permit discrete portions of a digital audio signal to be processed in the frequency domain utilizing a continuously variable block size. The techniques also can be implemented to permit an algorithm for processing a digital audio signal to utilize the precise time-frequency resolution that is appropriate for a particular block of audio data. Further, the techniques can be implemented such that the efficiencies of the FFT algorithm can be realized without limiting the time-frequency resolution. Additionally, the techniques can be implemented to include downsampling an upsampled signal, which can reduce the transient diffusion that results from some processing algorithms by condensing the disruptions in the frequency domain.

These general and specific techniques can be implemented using an apparatus, a method, a system, or any combination of an apparatus, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

Like reference symbols indicate like elements throughout the specification and drawings.

DETAILED DESCRIPTION

A continuously variable time-frequency resolution can be provided during digital audio signal processing through resampling. For example, a digital audio signal can be resampled before it is converted into the frequency domain. After performing frequency domain processing, the digital audio signal can be resampled a second time once it has been converted back into the time domain.

Figure 1:
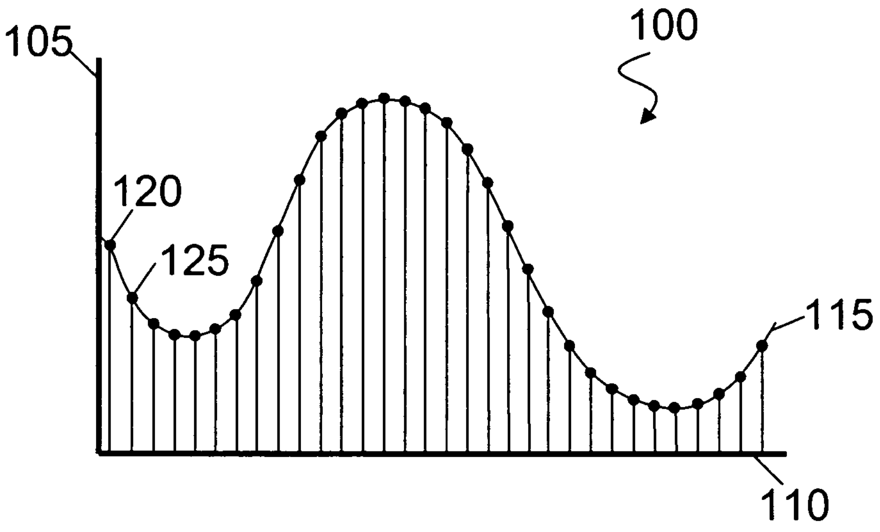
FIG. 1 presents an analog waveform.
Figure 2:
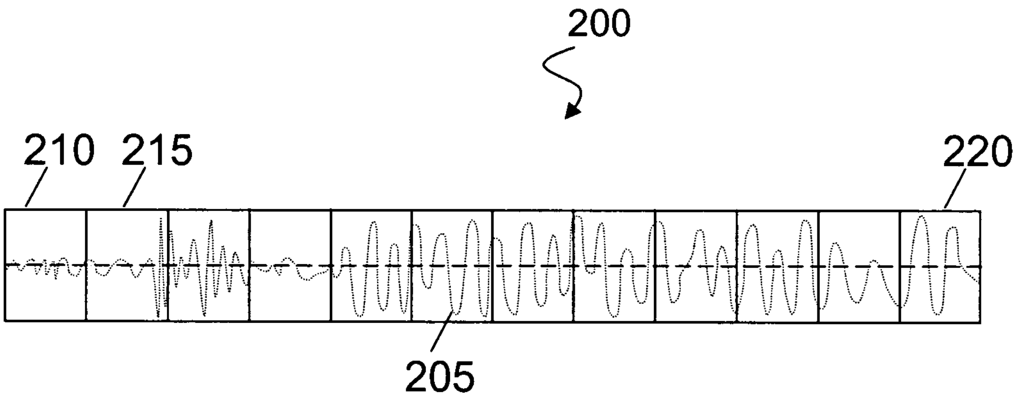
FIG. 2 is a diagram of a digital audio signal.

A Fourier transform can be used to convert a representation of an audio signal in the time domain into a representation of the audio signal in the frequency domain. Because an audio signal that is represented using a digital audio file is comprised of discrete samples instead of a continuous waveform, the conversion into the frequency domain can be performed using a Discrete Fourier Transform algorithm, such as the Fast Fourier Transform (FFT). FIG. 2 shows a digitized audio signal 200, in which the waveform 205 is represented by a plurality of discrete samples or points. The digitized audio signal 200 can be divided into a plurality of equal-sized blocks, such as a first block 210, a second block 215, and a last block 220. The number of samples included in each block defines the block width. One or more blocks of the digitized audio signal 200, such as the first block 210 and the second block 215, can be transformed from the time domain into the frequency domain to permit frequency domain processing.

Because one or more of the blocks associated with the digitized audio signal 200 will be transformed using an FFT, the block width can be set to a power of 2 that corresponds to the size of the FFT, such as 512 samples, 1,024 samples, 2,048 samples, or 4,096 samples. In an implementation, if the last block 220 includes fewer samples than are required to form a full block, one or more additional zero-value samples can be added to complete that block. For example, if the FFT size is 1,024 and the last block 220 only includes 998 samples, 26 zero-value samples can be added to fill in the remainder of the block.

As discussed previously, the size of the FFT determines the time and frequency resolution. For example, if a digital audio signal with a sampling rate of 44.1 kHz is transformed into the frequency domain using a 2,048 sample FFT, the 2,048 samples represent a portion of the digital audio signal lasting 46 milliseconds (2,048 samples/44,1000 samples per second). Similarly, a 1,024 sample FFT represents a portion of the digital audio signal lasting 23 milliseconds, or a period of time half as long. Thus, as the size of the FFT decreases, the duration of the portion of the digital audio signal being processed becomes shorter and the time resolution increases. Additionally, the FFT algorithm assumes that a signal is steady-state across an entire frame. Therefore, changes in a signal, such as transients, are more easily detected through the use of an FFT that processes a small number samples.

Conversely, the larger the size of the FFT, the greater the frequency resolution. For example, if a digital audio signal produced using a sampling rate of 44.1 kHz is transformed into the frequency domain using a 2,048 sample FFT, each frequency component represents 44.1 kHz/2,048 samples=21.5 Hz. Similarly, each frequency component of a 1,024 sample FFT represents 42.5 Hz, or twice the frequency range. Thus, the number of frequency components increases as the number of samples processed by the FFT grows larger, which results in a finer bandwidth being associated with each frequency component. Consequently, the frequency resolution increases directly with the size of the FFT. Other methods also can be used to convert a digital audio signal into the frequency domain, such as a filter-bank or the Modified Discrete Cosine Transform (MDCT). Regardless of the transform method used, however, time-resolution and frequency-resolution are inversely aligned.

The time-frequency resolution requirements of an audio processing algorithm can vary between audio signals or even between portions of a single audio signal. In some instances, the time-frequency resolution requirement may not correspond to the sizes available for the FFT algorithm, especially as the window size increases. It is possible, however, to use resampling to provide the time-frequency resolution required for a specific block of samples, thereby achieving continuously variable time-frequency resolution.

Figure 3:
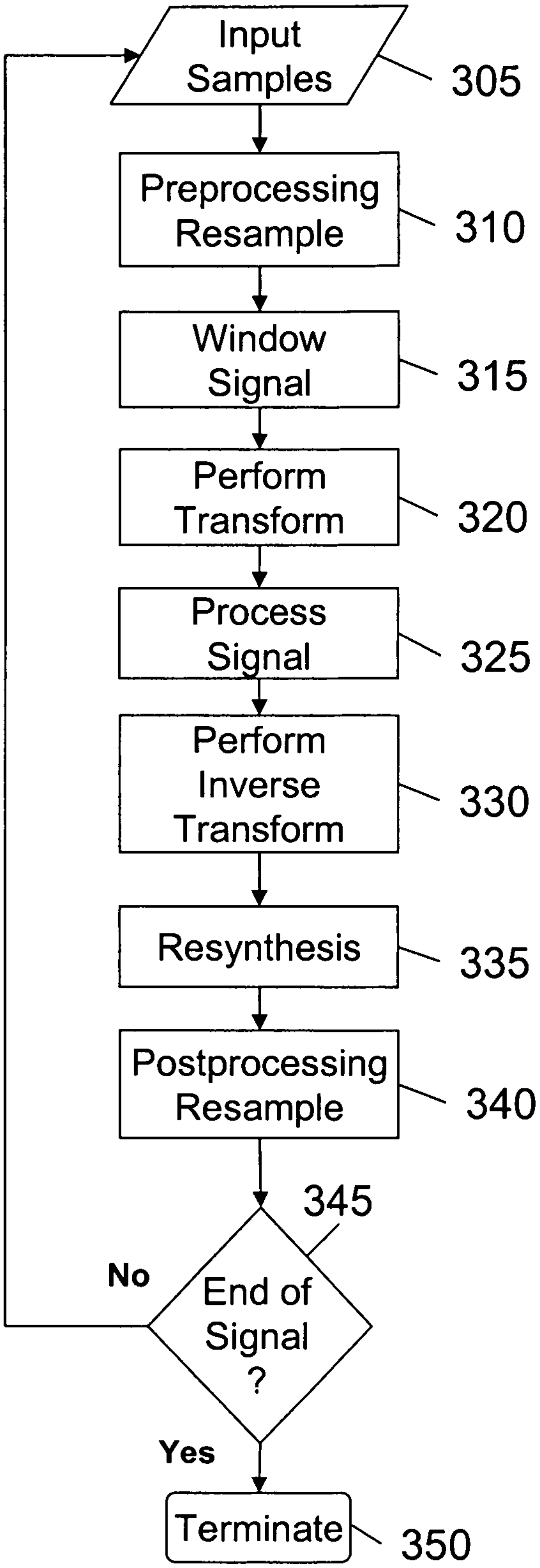
FIG. 3 presents a flowchart for providing continuously variable time-frequency analysis of a digital audio signal.

FIG. 3 presents a flowchart describing an implementation for processing a portion of a digital audio signal using continuously variable time-frequency resolution. In this implementation, a block of samples is upsampled prior to a signal processing operation and then downsampled after the signal processing operation has been completed. In another implementation, the upsampling and downsampling operations can be reversed. A block of samples is input (305) to the audio processing algorithm and can be designated as an input to the preprocessing resampler. The preprocessing resampler increases the number of samples in the block (310), which is also known as upsampling. Through upsampling, the number of samples in the block is made to equal or exceed the size of the FFT. The resampled block can then be windowed (315) using a sliding window and the samples included in the sliding window can be designated as input to an FFT. The width of the sliding window should equal the size of the FFT, so that all of the designated samples can be processed. As described above, the FFT can be used to transform the windowed samples from a time domain representation into a frequency domain representation (320). In performing the transform operation, the audio signal is divided into its component frequencies and the amplitude or intensity associated with each of the component frequencies is determined. The frequency resolution, or number of component frequencies that can be distinguished by the FFT, is equal to one-half of the window size. For example, a 1,024 sample FFT has a frequency resolution of 512 component frequencies or frequency bands. The 512 component frequencies represent a linear division of the frequency spectrum of the audio signal, such as 0 Hz to half of the Nyquist frequency.

Once the received samples have been transformed by the FFT (320), the resulting spectral values can be analyzed or processed (325). As described above, the processing can include one or more of: filtering, time stretching, equalization, and compression. After the portion of the digital audio signal has been processed (325), the signal can be transformed back into the time domain using the inverse FFT (IFFT) algorithm (330). The IFFT algorithm transforms the processed spectral values from a frequency domain representation into a time domain representation. Through the transform operation, the spectral values are converted into samples that represent amplitudes of the waveform comprising the digital audio signal at various points in time.

Resampling the input signal and changing the size of the FFT can affect the location of specific frequency information because both the sampling rate and the size of the FFT affect the bandwidth of each frequency component. For example, a 2,048 sample FFT taken of a digital audio signal characterized by a sampling rate of 40 kHz has a Nyquist frequency of 20 kHz, and thus each spectral value represents 40 kHz/2,048 sample FFT, or 19.53 Hz per component frequency. Therefore, the spectral value representing 30 Hz is contained in the second component frequency, assuming that the component frequencies are numbered starting with the lowest frequency. If the same signal was upsampled by 150% and a 4,096 sample FFT was used, the effective sampling rate would increase to 60 kHz. Similarly, the Nyquist frequency would be 30 kHz and each spectral value would represent 60 kHz/4,096 sample FFT, or 14.65 Hz per component frequency. Consequently, the spectral value representing 30 Hz would be contained in the third component frequency.

Next, the digital audio signal can be resynthesized (335). The resynthesis operation (335) can include overlapping and adding successive blocks that are output from the IFFT (330). For example, filtering in the frequency domain is often performed by overlapping and adding adjacent blocks to reduce ripple effects generated during processing. Furthermore, various windowing functions may benefit from overlapping and adding successive blocks output from the IFFT (330). The degree of overlap in the sliding window (315) may also affect the need to overlap and add the data output from the IFFT (330). Therefore, the resynthesis operation (335) can include an overlap and add procedure. In another implementation, the resynthesis operation (335) can align successive windows output from the IFFT without any overlap, such that they are adjacent to one another.

As a result of the preprocessing resample (310), the resynthesized digital audio signal has an increased sampling rate. To return the digital audio signal to the sampling rate by which it was characterized when it was input (305) to the audio processing algorithm, the digital audio signal can be downsampled (340). Downsampling is the process by which the sampling rate of a signal is reduced. Downsampling also can reduce the transient diffusion caused by some processing algorithms, because it condenses the disruptions caused in the frequency domain by some processing algorithms. For example, if a block of a digital audio signal contains a transient, an algorithm that process the block in the frequency domain can spread the energy associated with the transient across other samples included in that block. If the block is downsampled, the number of samples containing energy associate with the transient can be reduced, thereby making the transient less audible.

Further, the digital audio signal is evaluated (345) to determine whether any portion remains to be input (305) into the audio processing algorithm. The final block can be automatically identified when the end of the digital audio signal has been reached. Alternatively, a final block can be specified by a user or by an audio processing algorithm. If the final block of the digital audio signal has been transformed and analyzed, the audio processing algorithm can be terminated (350). If the final block of the digital audio signal has not been transformed, an appropriate number of the remaining samples are provided as input (305) to the audio processing algorithm.

Figure 4A:
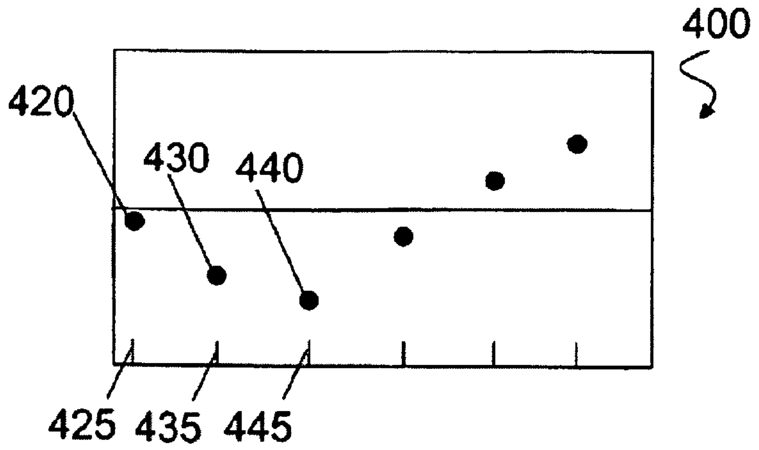
FIGS. 4*a*, 4*b*, and 4*c* depict a series of steps for upsampling a digital audio signal.
Figure 4B:
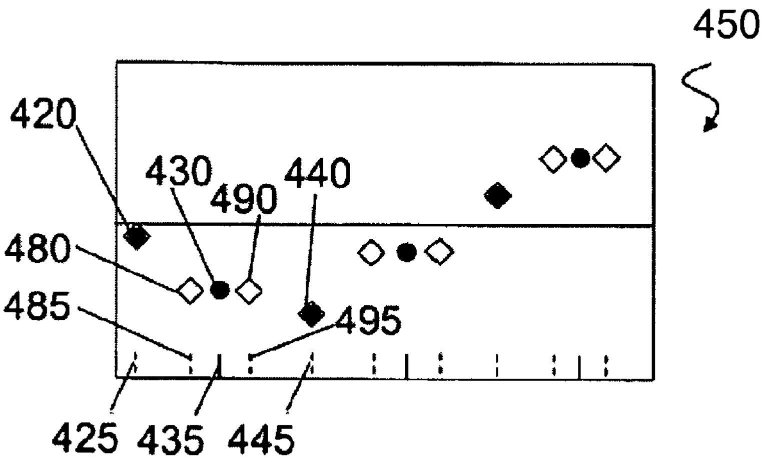
Figure 4C:
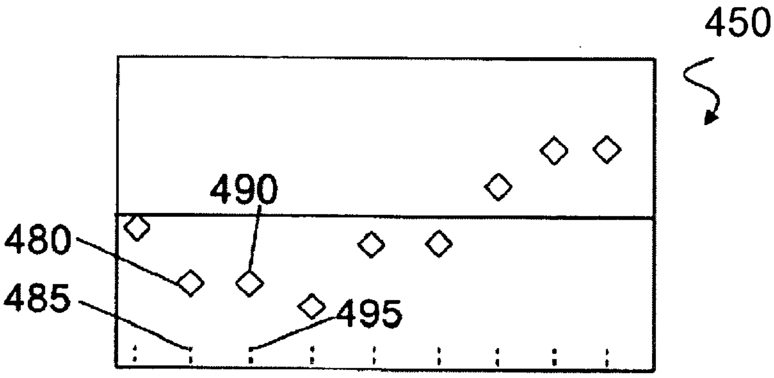

FIGS. 4*a*, 4*b*, and 4*c* illustrate steps for upsampling a digital audio signal. As described with respect to FIG. 3, samples are input (305) into the audio processing algorithm from the digital audio signal 200 and upsampled (310). The digital audio signal 400 represents a portion of the digital audio signal 200 that has been input (305) into the audio processing algorithm. In order to upsample a signal, an upsampling factor is selected. The upsampling factor can be any real value greater than or equal to one. For example, the upsampling factor could be 3/2, or 1.5, which corresponds to a 50% increase in the sampling rate. Thus, a digital audio signal with a 44.1 kHz sampling rate that has been upsampled by a factor of 1.5 has an effective sampling rate of 66.15 kHz. Consequently, the range of valid frequencies that satisfy the Nyquist sampling theorem is increased from 22.05 kHz to 33.075 kHz. In an implementation, the upsampling factor can be determined by the audio processing algorithm. Alternatively, the upsampling factor can be specified by a user.

With respect to FIG. 3, the upsampling factor determines, at least in part, the time-frequency resolution provided to the audio signal processing algorithm (325). As discussed above, the FFT size corresponds to a power of 2. Because the audio processing algorithm dictates the time-frequency resolution processing requirements, it also dictates the size of the FFT that will be used. An FFT is selected such that it is greater than the time-frequency resolution required by the audio processing algorithm and the input samples can then be upsampled to correspond to the selected FFT. For example, if the audio processing algorithm requires a time resolution of 2,730 samples, which corresponds to a frequency resolution of 1,345 component frequencies, the smallest FFT capable of processing that number of samples, a 4,096 sample FFT, is selected. As a result, the selected portion of the digital audio signal is upsampled accordingly. In order for the selected portion of the digital audio signal to be processed by a 4,096 sample FFT, the 2,730 samples must be upsampled by a factor of approximately 3/2 (4,096/2,730 equals 1.5004).

After the upsampling factor has been selected, band-limited interpolation can be used to perform the upsampling operation. Band-limited interpolation provides very good results, but can be computationally intensive. In another implementation, a simpler method, such as a first order approximation, can be used to upsample the signal. A first order approximation copies samples from the original signal at a rate approximating the inverse of the upsampling factor. For example, if the upsampling factor is 3/2, samples are copied from the original signal at a relative rate of every 2/3 sample.

FIG. 4*a* shows a digital audio signal 400 contained in a window 405 prior to upsampling. The digital audio signal 400 can be represented by sample points spaced along a time axis 410. A first original sample 420 is aligned on the time axis 410 with a first hash mark 425. Likewise, a second original sample 430 is aligned on the time axis 410 with a second hash mark 435, and a third original sample 440 is aligned with the time axis 410 at a third hash mark 445. In this implementation, the hash marks, including the first, second and third hash marks 425, 435, and 445, are evenly spaced, indicating that the samples, including the first, second and third samples 420, 430, and 440 respectively, are separated by equal periods of time.

Because the upsampling factor is a ratio of the sampling frequencies of the original signal and the upsampled signal, the inverse of the upsampling factor represents the ratio of the periods between samples of the original signal and the upsampled signal. As discussed above, a first order approximation can be used to copy samples from the digital audio signal every 1/upsampling factor period. For example, assuming an upsampling factor of 3/2, a first order approximation copies samples at multiples of 2/3 of the original signal. If an original sample is located at a point representing a multiple of 2/3 of the original signal time index, the original sample is copied, otherwise the closest in time sample point is copied.

Referring to FIG. 4*b*, the digital audio signal 400 can be upsampled at a rate of 3/2 to produce an upsampled digital audio signal 450. Samples located on the time axis at multiples of 2/3 (e.g., 0, 2/3, 4/3, 2, 8/3, etc.) are copied. If no sample is located at the position of a multiple along the time axis, the closest in time sample is copied. Diamond symbols, such as the second copied sample 480, denote copied samples, which represent the upsampled signal. The first original sample 420, aligned on the first hash mark 425, is the zero multiple of 2/3, so the first original sample 420 is copied. The second copied sample 480, aligned on the 2/3 hash mark 485 is closest in time to the second original sample 430, so the amplitude value associated with the second original sample 430 is copied to the second copied sample 480. Similarly, the fourth copied sample 490, aligned on the 4/3 hash mark 495 is also closest in time to the second original sample 430, so the amplitude value associated with the second original sample 430 is also copied to the fourth copied sample 490. This process can be repeated to derive the remaining copied samples.

FIG. 4*c* represents the upsampled digital audio signal 450. The second copied sample 480 and the fourth copied sample 490 represent two of the samples comprising the upsampled digital audio signal 450. Note that the upsampled digital audio signal 450 has more samples over the same period of time than the digital audio signal 400 from which it was produced. As presented, the digital audio signal 400 has 2/3 the number of samples as the upsampled digital audio signal 450, which corresponds to the upsampling ratio. The shape of the upsampled digital audio signal 450, through the inclusion of additional samples, does not perfectly match the shape of the digital audio signal 400. Consequently, some distortion has been created by the upsampling process. A smoothing, low-pass filter can be applied to digital audio signal 450 to reduce this distortion.

Figure 5A:
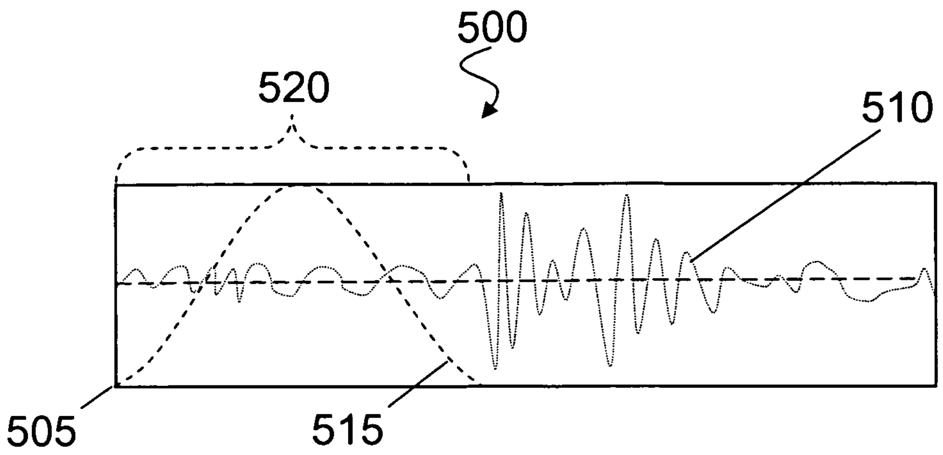
FIGS. 5*a* and 5*b* depict the alignment of a sliding window for a digital audio signal.
Figure 5B:
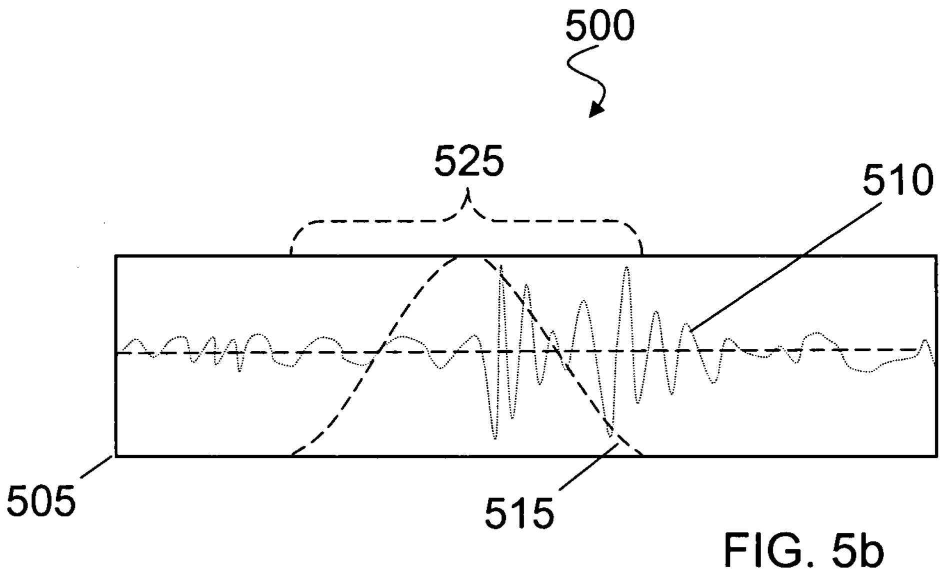

FIGS. 5*a* and 5*b* depict the alignment of a sliding window for a digital audio signal 500. FIG. 5*a* depicts the alignment of a sliding window for a previous iteration of the process illustrated in FIG. 3. FIG. 5*b* depicts the alignment of a sliding window associated with the current iteration of the process illustrated in FIG. 3. The digital audio signal 500 depicts a portion of the digital audio signal 200 that has been upsampled. A start time 505 is associated with the digital audio signal 500. With respect to FIG. 5*a*, a sliding window 515 can be positioned along the digital audio signal 500 at a first position 520, such that the start of the sliding window 515 is aligned with the start time 505 of the digital audio signal 500. As described with respect to FIG. 3, the portion of the digital audio signal 500 that occurs in the sliding window 515 at the first position 520 can be transformed into the frequency domain using an FFT (310). Before the digital audio signal 500 is transformed into the frequency domain, however, the sliding window 515 at the first position 520 is applied to the samples to reduce any high frequency edge effects. The width of the window 515 is selected to correspond to the size of the FFT. For example, if the FFT size is 4,096 samples, the window size is also set to 4,096 samples. Further, the shape of the window can be tailored to suit the audio processing algorithm (325).

FIG. 5*b* depicts the alignment of a sliding window associated with the current iteration of the process illustrated in FIG. 3. The sliding window 515 can be positioned along the digital audio signal 500 at a second position 525. The sliding window 515 at the first position 520 and the sliding window 515 at the second position 525 can have a degree of overlap. As described with respect to FIG. 3, the portion of the digital audio signal 500 in the sliding window 515 at the second position 525 can be transformed into the frequency domain using an FFT (310).

Figure 6A:
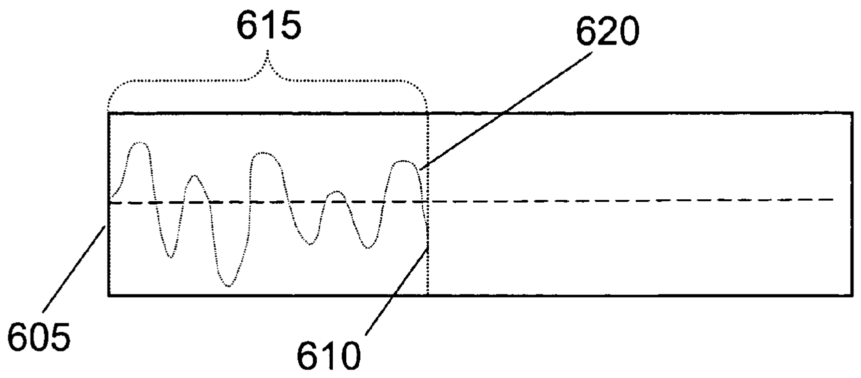
FIGS. 6*a*, 6*b*, and 6*c* depict steps for overlapping and adding two windows of a digital audio signal.
Figure 6B:
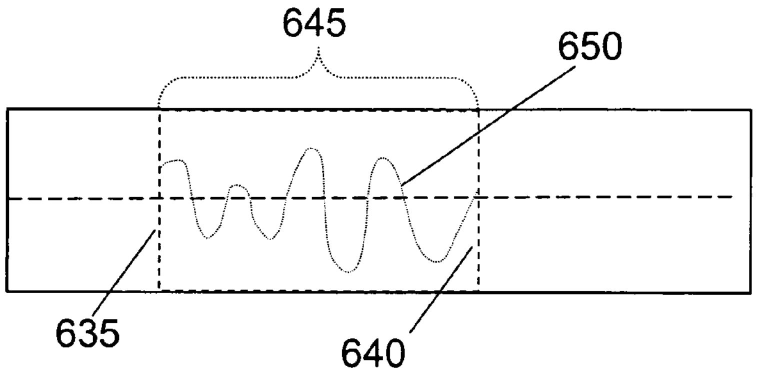
Figure 6C:
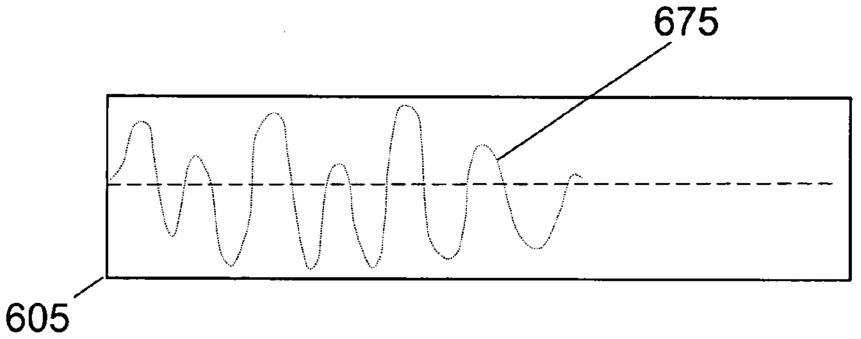

FIGS. 6*a*, 6*b* and 6*c* depict overlapping and adding two windows of a digital audio signal. FIG. 6*a* depicts a block 615 of a digital audio signal 620 that has been output from an IFFT (330) algorithm during a previous iteration of the process illustrated in FIG. 3. A start time 605 and a stop time 610 are associated with the digital audio signal 620. Similarly, FIG. 6*b* depicts a block 645 of a digital audio signal 650 output from an IFFT (330) algorithm during the current iteration of the process illustrated in FIG. 3. A start time 635 and a stop time 640 are associated with the digital audio signal 650. The block 615 of the digital audio signal 620 and the block 645 of the digital audio signal 650 can be added together using superposition to compensate for a tail created from processing a digital audio signal in the frequency domain, and from the overlapping input windows (315). Through the addition, the block 615 and the block 645 are resynthesized (335) into a continuous digital audio signal 675, as shown in FIG. 6*c*.

With respect to FIG. 3, after the signal has been resynthesized (355), the signal can be downsampled (340). To return a digital audio signal to its original sampling rate, the downsampling factor representing the inverse of the upsampling factor used in the preprocessing resampling (310) can be selected. For example, if the upsampling factor used in the preprocessing resampling (310) was 3/2, a downsampling factor of 2/3 can be selected. If a digital audio signal contains frequencies higher than the Nyquist frequency of the downsampling rate, the downsampled digital audio signal can contain aliasing artifacts. To prevent aliasing, a low-pass filter can be applied to the digital audio signal prior to downsampling.

Band-limited interpolation also can be used to downsample the signal in accordance with the selected downsampling factor. If band-limited interpolation is used, an additional low-pass filter need not be included because band-limited interpolation inherently filters the digital audio signal. In another implementation, a simpler resampling method, such as a first order approximation, can be used to downsample the signal.

Figure 7A:
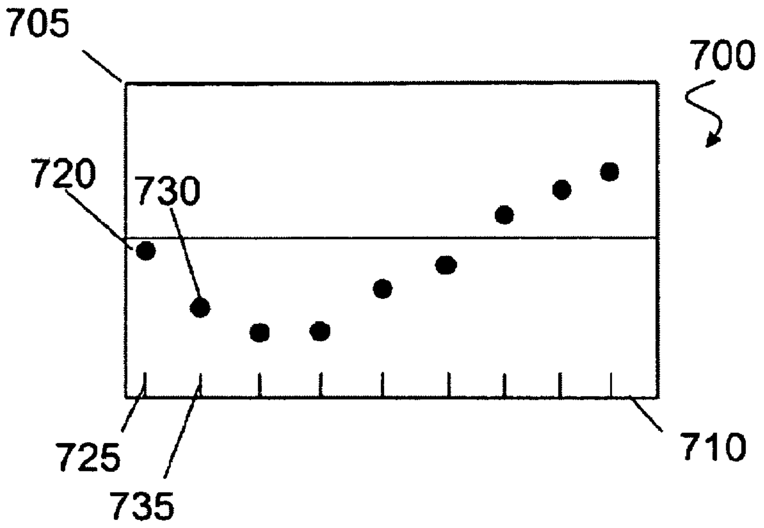
FIGS. 7*a*, 7*b*, and 7*c* depict a series of steps for downsampling a digital audio signal.

FIG. 7*a* shows a digital audio signal 700 contained in a window 705 prior to downsampling. The digital audio signal 700 can be represented by sample points spaced along a time axis 710. A first original sample 720 is aligned on the time axis 710 at a first hash mark 725. Likewise, a second original sample 730 is aligned on the time axis 710 at a second hash mark 735. The hash marks on the time axis 710, including the first and second hash marks 725 and 735, are evenly spaced, indicating that the samples, including the first and second original samples 720 and 730, respectively, are separated by equal periods of time. As discussed above, because the downsampling factor is a ratio of the sampling frequencies of the original signal and the downsampled signal, the inverse of the downsampling factor represents the ratio of the periods between samples of the original signal and the downsampled signal.

Figure 7B:
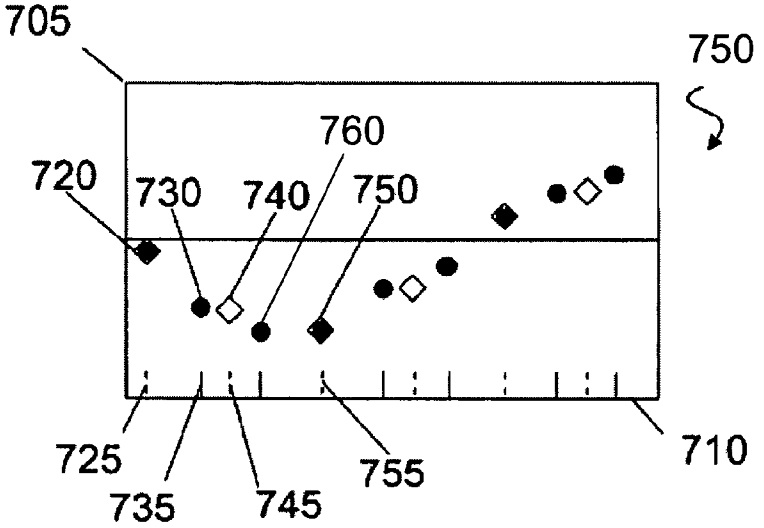

Referring to FIG. 7*b*, the digital audio signal 700 can be downsampled at a rate of 2/3 to produce a downsampled digital audio signal 750. Samples located on the time axis 710 at multiples of 3/2 (e.g., 0, 3/2, 3, 9/2, 6, etc.) are copied. If a sample is located at the position of a multiple of the inverse downsampling rate along the time axis 710, the sample is copied, otherwise the closest in time sample is copied. A default rule can be specified for the circumstance in which the position corresponding to a multiple falls evenly between two samples. For example, the previous sample always can be copied in such a case. Diamond symbols, such as the second copied sample 740, denote copied samples, which correspond to the downsampled digital audio signal 750. The first original sample 720, aligned on the first hash mark 725, is the zero multiple of 3/2, and is therefore copied. The second copied sample 740, representing the first multiple of 3/2, is aligned on the 3/2 hash mark 745 and is equidistant from the second original sample 730 and the third original sample 760. Thus, the amplitude value associated with the second original sample 730 is copied to the location of the second copied sample 740. This process is can be repeated for the remaining samples to derive the remaining copied samples.

Figure 7C:
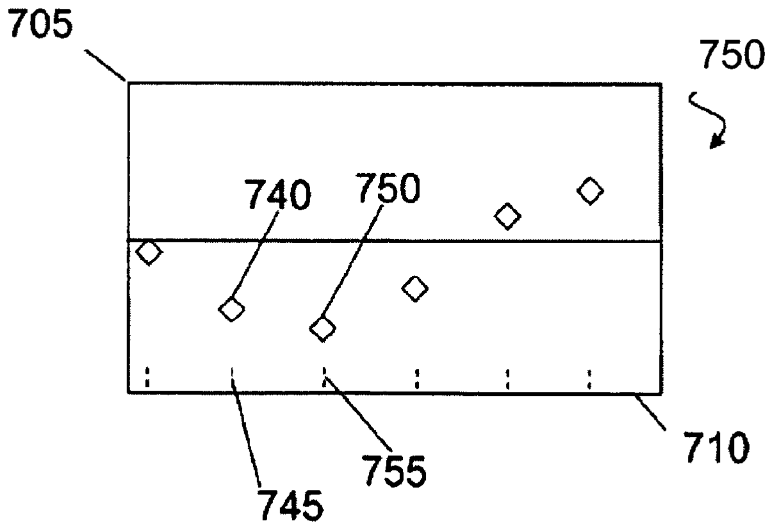

FIG. 7*c* represents the downsampled digital audio signal 750. The second copied sample 740 and the third copied sample 750 represent two of the samples comprising the downsampled digital audio signal 750. Note that the downsampled digital audio signal 750 has fewer samples over the same period of time than the digital audio signal 700 from which it was derived. The digital audio signal 700 has 3/2 the number of samples as the downsampled digital audio signal 750, which corresponds to the downsampling ratio.

In another implementation, the preprocessing resample (310) can be a downsampling process as depicted in FIGS. 7*a*, 7*b*, and 7*c* and described above. If the preprocessing resample (310) is a downsampling process, then the postprocessing resample (340) can be an upsampling process as depicted in FIGS. 4*a* and 4*b* and described above. Performing downsampling during the preprocessing resample (310) can be used to increase the frequency resolution while reducing the time resolution of a block of samples. For example, a block of 5,000 samples can be downsampled to produce a block of 4,096 samples, which can then be input into a standard sized FFT (320). Because larger FFTs require greater processing power, downsampling during the preprocessing resample (310), and thereby using a smaller FFT (320), can reduce the computational costs of an audio processing algorithm.

Figure 8:
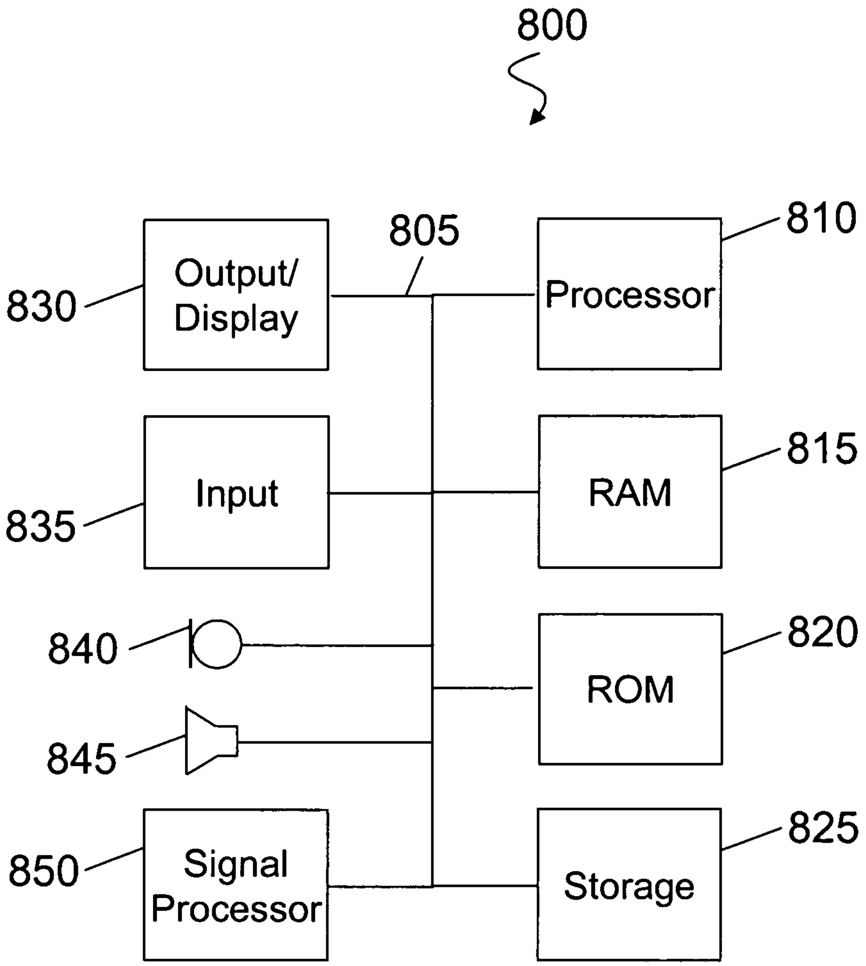
FIG. 8 is a block diagram of a computer system.

FIG. 8 presents a computer system 800 that can be used to implement the techniques described above for processing and playing back a digital audio signal. The computer system 800 includes a microphone 840 for receiving an audio signal. The microphone 840 is coupled to a bus 805 that can be used to transfer the audio signal to one or more additional components. The bus 805 can be comprised of one or more physical busses and permits communication between all of the components included in the computer system 800. A processor 810 can be used to digitize the received audio signal and the resulting digitized audio signal can be transferred to storage 825, such as a hard drive, flash drive, or other readable and writeable medium. Alternately, the digitized audio signal can be stored in a random access memory (RAM) 815.

The digitized audio signals available in the computer system 800 can be displayed along with operations involving the digital audio signals via an output/display device 830, such as a monitor, liquid crystal display panel, printer, or other such output device. An input 835 comprising one or more input devices also can be included to receive instructions and information. For example, the input 835 can include one or more of a mouse, a keyboard, a touch pad, a touch screen, a joystick, a cable interface, and any other such input devices known in the art. Further, audio signals also can be received by the computer system 800 through the input 835. Additionally, a read only memory (ROM) 820 can be included in the computer system 800 for storing information, such as sound processing parameters and instructions.

An audio signal, or any portion thereof, can be processed in the computer system 800 using the processor 810. In addition to digitizing received audio signals, the processor 810 also can be used to perform analysis, editing and playback functions, including the transient detection techniques described above. Further, the audio signal processing functions, including a function that requires continuously variable time-frequency resolution, also can be performed by a signal processor 850. Thus, the processor 810 and the signal processor 850 can perform any portion of the audio signal processing functions independently or cooperatively. Additionally, the computer system 800 includes an output 845, such as a speaker or an audio interface, through which audio signals can be played back.

Figure 9:
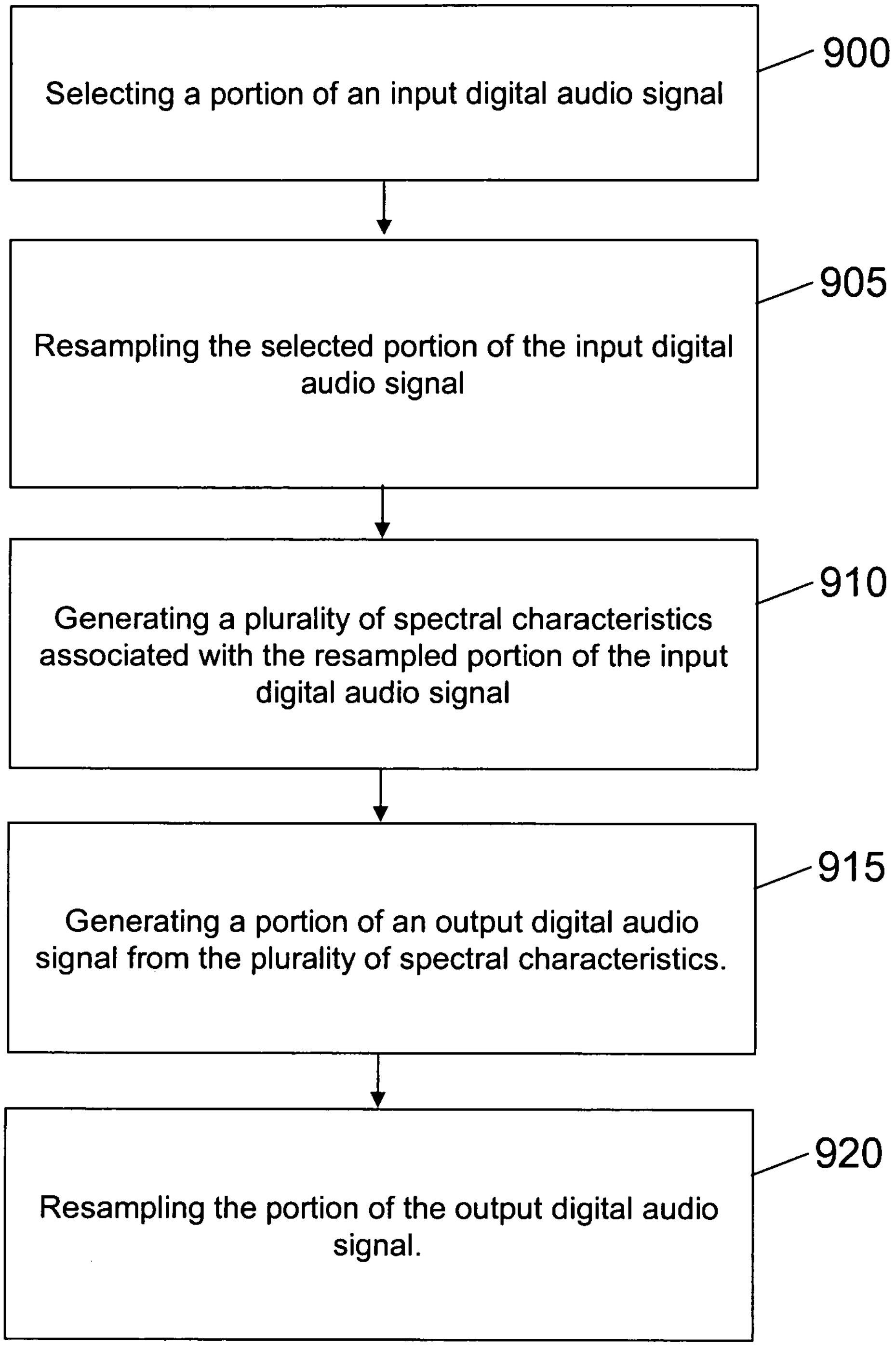
FIG. 9 describes a method for providing continuously variable time-frequency analysis of a digital audio signal.

FIG. 9 describes a method of providing continuously variable time-frequency resolution in an audio processing algorithm. In a first step 900, a portion of an input digital audio signal is selected. In a second step 905, the selected portion of the input digital audio signal can be resampled. In a third step 910, a plurality of spectral characteristics associated with the resampled portion of the input digital audio signal can be generated. Once the plurality of spectral characteristics have been generated, the fourth step 915 is to generate a portion of an output digital audio signal from the plurality of spectral characteristics. In a fifth step 920, the portion of the output digital audio signal can be resampled.

A number of implementations have been disclosed herein. Nevertheless, it will be understood that various modifications may be made without departing from the spirit and scope of the claims. Accordingly, other implementations are within the scope of the following claims.

What is claimed is:

1. A method of processing a digital audio signal using continuously variable time-frequency resolution, the method comprising:
- selecting a portion of an input digital audio signal, wherein the selected portion comprises a number of input samples;
- resampling the selected portion of the input digital audio signal;
- generating a plurality of spectral characteristics associated with the resampled portion of the input digital audio signal;
- generating a portion of an output digital audio signal from the plurality of spectral characteristics; and
- resampling the portion of the output digital audio signal to generate a number of output samples, wherein the number of output samples is substantially equal to the number of input samples.

2. The method of claim 1, further comprising:
- processing the plurality of spectral characteristics associated with the resampled portion of the input digital audio signal.

3. The method of claim 2, wherein processing further comprises:
- modifying either or both of a magnitude and a phase associated with one or more of the plurality of spectral characteristics.

4. The method of claim 1, wherein resampling the selected portion of the input digital audio signal comprises upsampling and resampling the portion of the output digital audio signal comprises downsampling.

5. The method of claim 1, wherein resampling the selected portion of the input digital audio signal comprises downsampling and resampling the portion of the output digital audio signal comprises upsampling.

6. The method of claim 1, wherein resampling the selected portion of the input digital audio signal comprises:
- determining a sampling ratio; and
- resampling the selected portion of the input digital audio signal in accordance with the determined sampling ratio.

7. The method of claim 6, further comprising:
- resampling the portion of the output digital audio signal in accordance with the inverse of the determined sampling ratio.

8. The method of claim 6, further comprising:
- determining the sampling ratio based on the size of a Fast Fourier Transform (FFT).

9. The method of claim 6, further comprising:
- determining the sampling ratio based on a time-frequency resolution requirement associated with an audio processing algorithm.

10. An article of manufacture comprising a non-transitory computer readable medium storing thereon machine-readable instructions for processing a digital audio signal using continuously variable time-frequency resolution, the machine-readable instructions being operable to perform operations comprising:
- selecting a portion of an input digital audio signal wherein the selected portion comprises a number of input samples;
- resampling the selected portion of the input digital audio signal;
- generating a plurality of spectral characteristics associated with the resampled portion of the input digital audio signal;
- generating a portion of an output digital audio signal from the plurality of spectral characteristics; and
- resampling the portion of the output digital audio signal to generate a number of output samples, wherein the number of output samples is substantially equal to the number of input samples.

11. The article of manufacture comprising a non-transitory computer readable medium storing thereon machine-readable instructions of claim 10, wherein the machine-readable instructions are further operable to perform operations comprising:
- processing the plurality of spectral characteristics associated with the resampled portion of the input digital audio signal.

12. The article of manufacture comprising a non-transitory computer readable medium storing thereon machine-readable instructions of claim 11, wherein the machine-readable instructions are further operable to perform operations comprising:
- modifying either or both of a magnitude and a phase associated with one or more of the plurality of spectral characteristics.

13. The article of manufacture comprising a non-transitory computer readable medium storing thereon machine-readable instructions of claim 10, wherein resampling the selected portion of the input digital audio signal comprises upsampling and resampling the portion of the output digital audio signal comprises downsampling.

14. The article of manufacture comprising a non-transitory computer readable medium storing thereon machine-readable instructions of claim 10, wherein resampling the selected portion of the input digital audio signal comprises downsampling and resampling the portion of the output digital audio signal comprises upsampling.

15. The article of manufacture comprising a non-transitory computer readable medium storing thereon machine-readable instructions of claim 10, wherein the machine-readable instructions are further operable to perform operations comprising:
- determining a sampling ratio; and
- resampling the selected portion of the input digital audio signal in accordance with the determined sampling ratio.

16. The article of manufacture comprising a non-transitory computer readable medium storing thereon machine-readable instructions of claim 15, wherein the machine-readable instructions are further operable to perform operations comprising:
- resampling the portion of the output digital audio signal in accordance with the inverse of the determined sampling ratio.

17. The article of manufacture comprising a non-transitory computer readable medium storing thereon machine-readable instructions of claim 15, wherein the machine-readable instructions are further operable to perform operations comprising:

determining the sampling ratio based on the size of a Fast Fourier Transform (FFT).

18. The article of manufacture comprising a non-transitory computer readable medium storing thereon machine-readable instructions of claim 15, wherein the machine-readable instructions are further operable to perform operations comprising:

determining the sampling ratio based on a time-frequency resolution requirement associated with an audio processing algorithm.

19. A system for processing a digital audio signal using continuously variable time-frequency resolution, the system comprising processor electronics configured to perform operations comprising:

selecting a portion of an input digital audio signal, wherein the selected portion comprise a number of input samples;

resampling the selected portion of the input digital audio signal;

generating a plurality of spectral characteristics associated with the resampled portion of the input digital audio signal;

generating a portion of an output digital audio signal from the plurality of spectral characteristics; and resampling the portion of the output digital audio signal to generate a number of output samples, wherein the number of output samples is substantially equal to the number of input samples.

20. The system of claim 19, wherein the processor electronics are further configured to perform operations comprising:

processing the plurality of spectral characteristics associated with the resampled portion of the input digital audio signal.

21. The system of claim 19, wherein the processor electronics are further configured to perform operations comprising:

resampling the selected portion of the input digital audio signal by upsampling; and resampling the portion of the output digital audio signal by downsampling.

22. The system of claim 19, wherein the processor electronics are further configured to perform operations comprising:

resampling the selected portion of the input digital audio signal by downsampling; and resampling the portion of the output digital audio signal by upsampling.

23. The system of claim 19, wherein the processor electronics are further configured to perform operations comprising:

determining a sampling ratio; and resampling the selected portion of the input digital audio signal in accordance with the determined sampling ratio.

24. The system of claim 23, wherein the processor electronics are further configured to perform operations comprising:

resampling the portion of the output digital audio signal in accordance with the inverse of the determined sampling ratio.

25. The system of claim 23, wherein the processor electronics are further configured to perform operations comprising:

determining the sampling ratio based on a time-frequency resolution requirement associated with an audio processing algorithm.

* * * * *